R. J. BURROWS.
AXLE FOR MOTOR VEHICLES.
APPLICATION FILED JUNE 18, 1917.
1,282,748.
Patented Oct. 29, 1918.
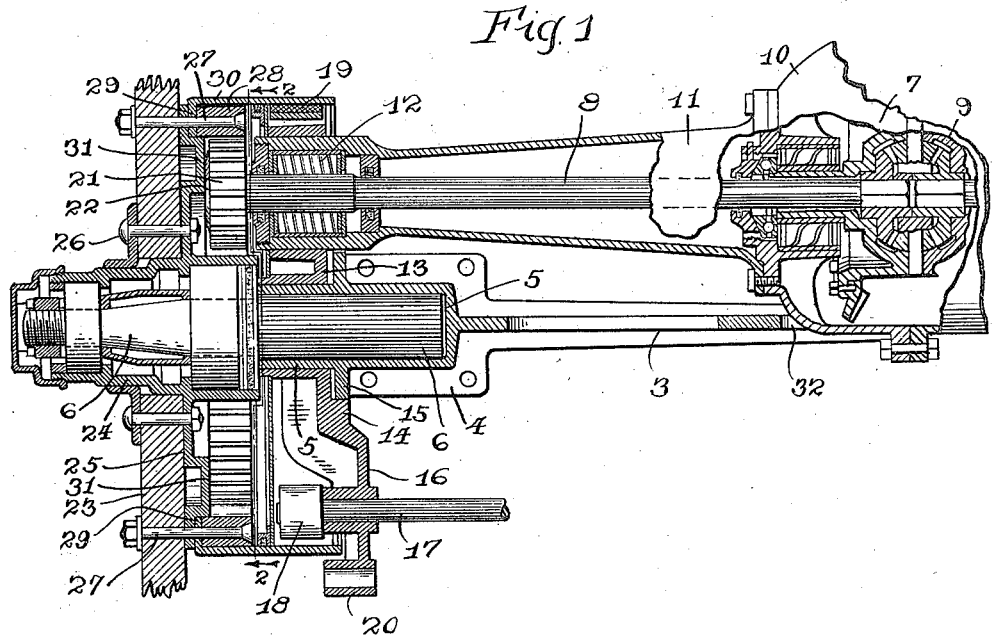
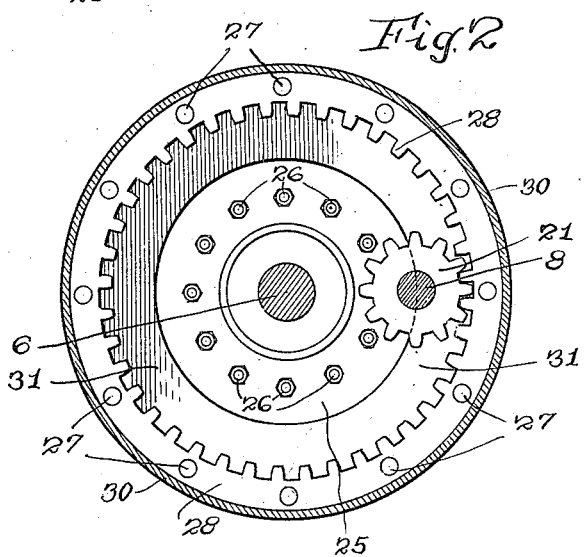
Witness:
L. B. Graham
Inventor:
Robert J. Burrows,
Adams & Jackson.
By
Att'ys.

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR-VEHICLES.

1,282,748.

Specification of Letters Patent.  Patented Oct. 29, 1918.

Application filed June 18, 1917. Serial No. 175,507.

*To all whom it may concern:*

Be it known that I, ROBERT J. BURROWS, a citizen of the United States, and a resident of Buchanan, in the county of Berrien and State of Michigan, have invented certain new and useful Improvements in Axles for Motor-Vehicles, of which the following is a specification, reference being had to the accompanying drawings.

My invention relates to axles for motor vehicles of the type in which the axle as a whole comprises two principal members, a dead axle member which carries the wheel spindles, and a live axle through which power from the usual motor is transmitted to the wheels. Such live axle usually consists of differential gearing of any approved type which receives power from the motor through a propeller shaft, and transmits the power to the wheels by means of jack shafts carrying pinions at their outer ends which mesh with gears, either internal or external, carried by the vehicle wheels. My present invention has particularly to do with axles of this general description and has for its object to provide certain improvements by which the jack shafts may readily be removed when the wheels are dismounted, and are held in operative position against endwise movement by the wheels when the latter are in place on the spindles. I accomplish this object as illustrated in the drawings and as hereinafter described. That which I believe to be new will be set forth in the claims.

In the accompanying drawings,—

Figure 1 is a partial sectional view of my improved axle with the wheel in place; and Fig. 2 is an end view of the axle with the wheel removed, the brake drum being in section.

Referring to the drawings, 3 indicates the dead axle member which, in the construction shown, is in the form of an I-beam having spring seats 4 at its ends, said seats having sleeves 5 to receive the inner ends of wheel spindles 6.  7 indicates the differential gearing and 8—9 the jack shafts heretofore referred to.  The differential gearing 7 is mounted in a differential housing 10 which may be of any suitable construction, and is provided with laterally-projecting sleeves 11 which inclose the jack shafts 8 and also carry at their outer ends roller or other anti-friction bearings 12 in which the outer ends of the jack shafts 8 are mounted. The outer end of each of the sleeves 11 is mounted in a suitable socket in a plate or bracket 13 mounted upon the sleeve 5 and non-rotatably engaging the dead axle member by means of a shoulder 14 which engages a flange 15 carried by the spring seat 4, as shown in Fig. 1. The bracket 14 is also provided with an arm 16 which carries a brake-operating shaft 17. Said shaft 17 carries the usual brake-operating cam 18 and may be rocked by a lever (not shown) in the usual way. 19 indicates a brake band of the ordinary type which is mounted upon the bracket or plate 14 and is adapted to be expanded by the rocking of the cam 18. The arms 16 may also carry a bearing 20 in which may be mounted an external brake of any suitable type.

21 indicates one of the pinions which are mounted upon the ends of the jack shafts 8—9. As indicated at 22 in Fig. 1, the outer faces of the pinions 21 are rounded slightly and are flush with the outer ends of the jack shafts on which they are mounted. The purpose of this construction will be hereinafter explained.

23 indicates the spokes of one of the vehicle wheels of which 24 is the hub. 25 indicates a disk or plate secured to the inner face of the wheel around the hub, being preferably cast integral with the hub. Said plate is fixedly secured to the spokes by bolts 26—27, the latter bolts serving also to secure in position an internal gear ring 28 which is in position to mesh with the pinion 21 when the wheel is in place. Fitted between the gear ring 28 and the disk 25 is an inturned flange 29 carried by a brake drum 30 which extends over the gear ring 28 and brake band 19, as shown in Fig. 1. The inner edge of the flange 29 abuts against an annular rib or offset portion 31 provided on the outer face of the disk 25 in such position that it bears against the adjacent or outer face of the pinion 21 and the corresponding end of the jack shaft on which such pinion is mounted. This rib, therefore, not only helps to hold the brake drum 30 in position, but also serves as a thrust bearing to prevent material endwise movement of the jack shaft. The bearing face of the pinion is rounded, as has been described, to provide a smoother bearing surface and to prevent excessive friction. The rib 31 being annular, it will be apparent that notwithstanding the rotation of the wheel, said rib will constantly be in position to bear against the outer face of the driving pinion and prevent the jack shaft from moving endwise out of operative position. By removing the wheel, the pinion 21 and the outer end of the jack shaft are exposed, thereby permitting the jack shaft and pinion to be removed by simply drawing the jack shaft endwise out of its bearings. When the jack shaft is replaced and the wheel again mounted on the spindle the wheel at once holds the jack shaft in proper operative position. It will be understood, of course, that the inner ends of the jack shafts have a non-rotary engagement with the differential gearing as shown in Fig. 1, but may be disconnected therefrom by moving said jack shafts endwise, as will be manifest from the illustration.

In the drawings I have shown the differential housing 10 as extending through an opening 32 in the center of the dead axle member 3, but this is not essential, and the dead and live axle members may either be connected intermediately with each other or be independent of each other as may be preferred.

What I claim as my invention and desire to secure by Letters Patent, is—

1. An axle for motor vehicles comprising a dead axle member having wheel spindles, a live axle member substantially parallel therewith and having differential gearing, jack shafts driven by said differential gearing, and pinions carried by said jack shafts, in combination with wheels mounted on said spindles, gears carried by said wheels and meshing with said pinions, and annular bearings interposed between said wheels and the adjacent ends of said jack shafts, whereby said bearings operate to hold said jack shafts against endwise movement.

2. An axle for motor vehicles comprising a dead axle member having wheel spindles, a live axle member substantially parallel therewith and having differential gearing, jack shafts driven by said differential gearing, and pinions carried by said jack shafts, in combination with wheels mounted on said spindles, gears carried by said wheels and meshing with said pinions, and plates secured to said wheels and having annular ribs disposed opposite the ends of said jack shafts, whereby said ribs constitute thrust bearings for said jack shafts and hold them against endwise movement.

3. An axle for motor vehicles comprising a dead axle member having wheel spindles, a live axle member substantially parallel therewith and having differential gearing, jack shafts driven by said differential gearing and adapted to be disconnected therefrom by endwise movement, and pinions carried by said jack shafts, in combination with wheels mounted on said spindles, gears carried by said wheels and meshing with said pinions, and means carried by said wheels and bearing against the outer ends of said jack shafts for holding them against endwise movement.

4. An axle for motor vehicles comprising a dead axle member having wheel spindles, a live axle member substantially parallel therewith and having differential gearing, jack shafts driven by said differential gearing and adapted to be moved endwise out of operative engagement therewith, a housing for said differential gearing, sleeves inclosing said jack shafts, roller bearings in said sleeves and supporting the outer end portions of said jack shafts, and pinions mounted upon the outer ends of said jack shafts, in combination with wheels mounted upon said spindles, and having means adapted to bear against the ends of said jack shafts for holding them against endwise movement, and gears carried by said wheels and meshing with said pinions.

5. An axle for motor vehicles comprising a dead axle member having wheel spindles, a live axle member substantially parallel therewith and having differential gearing, jack shafts driven by said differential gearing and adapted to be moved endwise out of operative engagement therewith, a housing for said differential gearing, sleeves inclosing said jack shafts, roller bearings in said sleeves and supporting the outer end portions of said jack shafts, and pinions mounted upon the outer ends of said jack shafts, in combination with wheels mounted upon said spindles, gears carried by said wheels and meshing with said pinions, and annular ribs carried by said wheels and adapted to bear against the outer ends of said jack shafts for preventing endwise movement thereof.

6. The combination with a dead axle member, wheel spindles carried thereby, and a live axle member comprising jack shafts and pinions carried by said jack shafts, of wheels mounted on said spindles, gears carried by said wheels and meshing with said pinions, plates carried on the inner faces of said wheels, said plates having laterally projecting annular ribs, brake drums secured to said wheels and having internally-projecting flanges adapted to bear against said ribs, and brakes mounted on the dead axle member and adapted to engage the inner surfaces of said brake drums.

7. The combination with a dead axle member, wheel spindles carried thereby, and a live axle member comprising jack shafts and pinions carried by said jack shafts, of wheels mounted on said spindles, gears carried by said wheels and meshing with said pinions, plates carried on the inner faces of said wheels, said plates having laterally projecting annular ribs, brake drums secured to said wheels and having internally-projecting flanges adapted to bear against said ribs, and brakes mounted on the dead axle member and adapted to engage the inner surfaces of said brake drums, said ribs forming also end bearings for said jack shafts.

ROBERT J. BURROWS.